(12) United States Patent
Tomic et al.

(10) Patent No.: US 10,942,662 B2
(45) Date of Patent: Mar. 9, 2021

(54) RELOCATING AND/OR RE-PROGRAMMING BLOCKS OF STORAGE SPACE BASED ON CALIBRATION FREQUENCY AND RESOURCE UTILIZATION

(71) Applicant: International Business Machines Corporation, Armonk, NY (US)

(72) Inventors: Sasa Tomic, Kilchberg (CH); Nikolaos Papandreou, Thalwil (CH); Roman A. Pletka, Uster (CH); Nikolas Ioannou, Zurich (CH); Aaron D. Fry, Richmond, TX (US); Timothy J. Fisher, Cypress, TX (US)

(73) Assignee: International Business Machines Corporation, Armonk, NY (US)

( * ) Notice: Subject to any disclaimer, the term of this patent is extended or adjusted under 35 U.S.C. 154(b) by 60 days.

(21) Appl. No.: 16/206,707

(22) Filed: Nov. 30, 2018

(65) Prior Publication Data
US 2020/0174664 A1   Jun. 4, 2020

(51) Int. Cl.
G06F 3/06 (2006.01)
(52) U.S. Cl.
CPC ............ G06F 3/064 (2013.01); G06F 3/0619 (2013.01); G06F 3/0647 (2013.01); G06F 3/0689 (2013.01)
(58) Field of Classification Search
CPC ...... G06F 3/064; G06F 3/0619; G06F 3/0647; G06F 3/0689
See application file for complete search history.

(56) References Cited

U.S. PATENT DOCUMENTS

| 8,130,551 | B2 | 3/2012 | Oowada et al. |
| 9,135,106 | B2 | 9/2015 | Weathers et al. |
| 9,230,687 | B2 | 1/2016 | Cordero et al. |
| 9,251,909 | B1 | 2/2016 | Camp et al. |
| 9,280,420 | B2 | 3/2016 | Yoon et al. |
| 9,483,395 | B2 | 11/2016 | Sreekandath et al. |
| 9,747,158 | B1 | 8/2017 | Kannan et al. |
| 9,904,479 | B1 | 2/2018 | Chen et al. |

(Continued)

OTHER PUBLICATIONS

Pletka et al., "Holistic Flash Management for Next Generation All-Flash Arrays," IBM Flash Memory Summit, 2015, 17 pages.

(Continued)

*Primary Examiner* — Masud K Khan
(74) *Attorney, Agent, or Firm* — Zilka-Kotab, P.C.

(57) ABSTRACT

A computer-implemented method, according to one embodiment, includes: calibrating a first block of storage space in memory, identifying a page in the calibrated first block having a highest RBER, and determining whether the RBER of the identified page is greater than an error correction code limit. In response to determining that the RBER of the identified page is not greater than the error correction code limit, a determination is made as to whether the RBER of the identified page is greater than a relocation limit. In response to determining that the RBER of the identified page is not greater than a relocation limit, another determination is made as to whether the first block has been excessively calibrated. Furthermore, in response to determining that the first block has been excessively calibrated, data in the first block relocated to a second block of storage space in the memory.

17 Claims, 9 Drawing Sheets

(56) References Cited

U.S. PATENT DOCUMENTS

| | | | |
|---|---|---|---|
| 2008/0198950 A1* | 8/2008 | Suyama | G06F 11/0751 |
| | | | 375/340 |
| 2010/0088540 A1 | 4/2010 | Chu et al. | |
| 2016/0027521 A1 | 1/2016 | Lu | |
| 2016/0110124 A1 | 4/2016 | Camp et al. | |
| 2016/0170672 A1* | 6/2016 | Li | G06F 3/0619 |
| | | | 711/103 |
| 2016/0315635 A1 | 10/2016 | Cai et al. | |
| 2017/0161141 A1 | 6/2017 | Shereshevski et al. | |
| 2018/0032268 A1* | 2/2018 | Barndt | G06F 3/0616 |
| 2018/0034476 A1* | 2/2018 | Kayser | G06F 3/0679 |
| 2018/0060148 A1 | 3/2018 | Rudy et al. | |
| 2018/0129575 A1* | 5/2018 | Dallabora | G06F 3/0604 |

OTHER PUBLICATIONS

Cai et al., "Error Analysis and Retention-Aware Error Management for NAND Flash Memory," Intel Technology Journal, vol. 17, No. 1, 2013, pp. 140-164.

Cai et al., "Flash Correct-and-Refresh, Retention-Aware Error Management for Increased Flash Memory Lifetime," Carnegie Mellon University presentation, 2012, pp. 1-56, retrieved from https://people.inf.ethz.ch/omutlu/pub/mutlu_iccd12_talk.pdf.

Debao et al., "BPM: A Bad Page Management Strategy for the Lifetime Extension of Flash Memory," Proceedings of the ASME 2015 International Design Engineering Technical Conferences & Computers and Information in Engineering Conference, 2015, 9 pages.

U.S. Appl. No. 15/976,586, filed May 10, 2018.

\* cited by examiner

RELOCATING AND/OR RE-PROGRAMMING BLOCKS OF STORAGE SPACE BASED ON CALIBRATION FREQUENCY AND RESOURCE UTILIZATION

BACKGROUND

The present invention relates to data storage systems, and more particularly, this invention relates to calibrating blocks of storage space in non-volatile memory.

Using Flash memory as an example, the performance characteristics of conventional NAND Flash-based solid state drives (SSDs) are fundamentally different from those of traditional hard disk drives (HDDs). Data in conventional SSDs is typically organized in pages of 4, 8, or 16 KB sizes. Moreover, page read operations in SSDs are typically one order of magnitude faster than write operations and latency neither depends on the current nor the previous location of operations.

The raw bit error rate (RBER) of a Flash memory block will typically increase over time due to additional program and erase cycling, charge leakage from retention, and additional charge placed in the cells by read operations (i.e., read disturb errors). Typically, a Flash memory block is retired when any page in the block exhibits a code word that reaches a page retirement error count limit. This limit is typically set to be achieved in conjunction with an appropriate error correction code (ECC), resulting in the Uncorrectable Bit Error Rate (UBER) after applying the ECC for a Flash memory block being set to be similar to the UBER in traditional hard disk drives, e.g., at around $10^{-15}$, but may be more or less.

Read voltage shifting, also known as block calibration, has been shown to be a key contributor to enhance endurance and retention, particularly for enterprise-level Flash memory systems using modern three-dimensional (3-D) triple-level-cell (TLC) or quad-level-cell (QLC) NAND Flash memory. Previous attempts to maintain efficient memory performance typically included inspecting the read voltages for each block of memory in a sweeping fashion or by a read voltage shifting algorithm that tracks and corrects the read voltages depending on how the threshold voltage distributions have changed as a result of cycling or retention or other disturbing effects. Moreover, upon identifying a block which was a calibration candidate, these previous attempts would perform block-level calibrations in which all pages in the identified block would be calibrated. It follows that these previous attempts involved inspecting each block of memory individually. Furthermore, although a block of memory is identified as being a candidate for calibration, typically not all pages in the block benefit from the calibration.

SUMMARY

A computer-implemented method, according to one embodiment, includes: calibrating a first block of storage space in memory, identifying a page in the calibrated first block having a highest RBER, and determining whether the RBER of the identified page is greater than an error correction code limit. In response to determining that the RBER of the identified page is not greater than the error correction code limit, a determination is made as to whether the RBER of the identified page is greater than a relocation limit. In response to determining that the RBER of the identified page is not greater than a relocation limit, another determination is made as to whether the first block has been excessively calibrated. Furthermore, in response to determining that the first block has been excessively calibrated, data in the first block relocated to a second block of storage space in the memory.

A computer program product, according to another embodiment, includes a computer readable storage medium having program instructions embodied therewith. The computer readable storage medium is not a transitory signal per se. Moreover, the program instructions are readable and/or executable by a processor to cause the processor to perform a method which includes: calibrating, by the processor, a first block of storage space in memory; identifying, by the processor, a page in the calibrated first block having a highest RBER; and determining, by the processor, whether the RBER of the identified page is greater than an error correction code limit. In response to determining that the RBER of the identified page is not greater than the error correction code limit, a determination is made, by the processor, as to whether the RBER of the identified page is greater than a relocation limit. In response to determining that the RBER of the identified page is not greater than a relocation limit, another determination is made, by the processor, as to whether the first block has been excessively calibrated. Furthermore, in response to determining that the first block has been excessively calibrated, data in the first block is relocated, by the processor, to a second block of storage space in the memory.

A system, according to yet another embodiment, includes: a processor; and logic integrated with and/or executable by the processor. The logic is configured to: calibrate, by the processor, a first block of storage space in memory; identify, by the processor, a page in the calibrated first block having a highest RBER; and determine, by the processor, whether the RBER of the identified page is greater than an error correction code limit. In response to determining that the RBER of the identified page is not greater than the error correction code limit, a determination is made, by the processor, as to whether the RBER of the identified page is greater than a relocation limit. In response to determining that the RBER of the identified page is not greater than a relocation limit, another determination is made, by the processor, as to whether the first block has been excessively calibrated. Furthermore, in response to determining that the first block has been excessively calibrated, data in the first block is relocated, by the processor, to a second block of storage space in the memory.

Other aspects and embodiments of the present invention will become apparent from the following detailed description, which, when taken in conjunction with the drawings, illustrate by way of example the principles of the invention.

DETAILED DESCRIPTION

Figure 1:
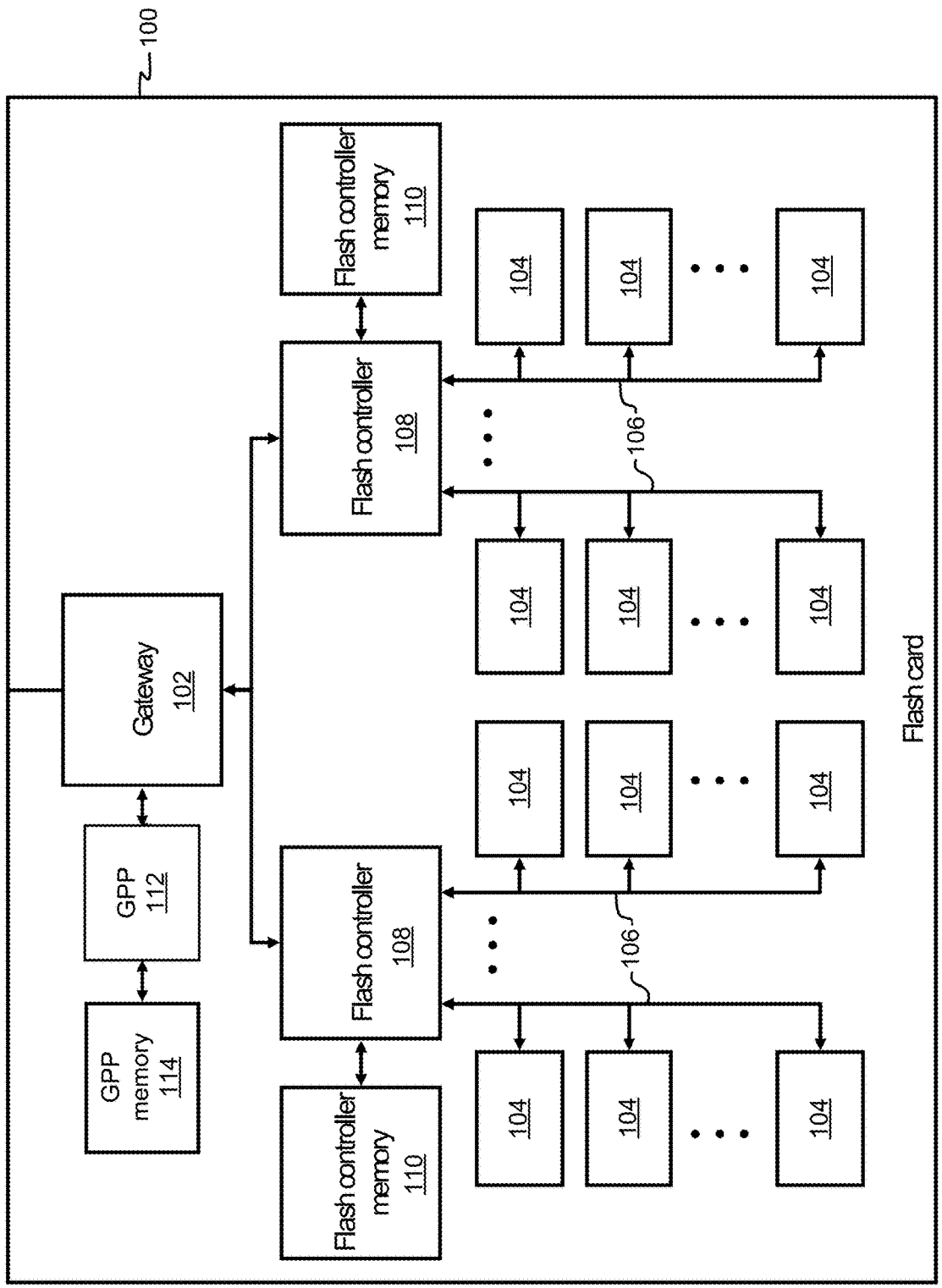
FIG. 1 is a diagram of a non-volatile memory card, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of data storage systems, as well as operation and/or component parts thereof. It should be appreciated that various embodiments herein can be implemented with a wide range of memory mediums, including for example non-volatile random access memory (NVRAM) technologies such as NAND Flash memory, NOR Flash memory, phase-change memory (PCM), magnetoresistive RAM (MRAM) and resistive RAM (RRAM). To provide a context, and solely to assist the reader, various embodiments may be described with reference to a type of non-volatile memory. This has been done by way of example only, and should not be deemed limiting on the invention defined in the claims.

In one general embodiment, a computer-implemented method includes: calibrating a first block of storage space in memory, identifying a page in the calibrated first block having a highest RBER, and determining whether the RBER of the identified page is greater than an error correction code limit. In response to determining that the RBER of the identified page is not greater than the error correction code limit, a determination is made as to whether the RBER of the identified page is greater than a relocation limit. In response to determining that the RBER of the identified page is not greater than a relocation limit, another determination is made as to whether the first block has been excessively calibrated. Furthermore, in response to determining that the first block has been excessively calibrated, data in the first block relocated to a second block of storage space in the memory.

In another general embodiment, a computer program product includes a computer readable storage medium having program instructions embodied therewith. The computer readable storage medium is not a transitory signal per se. Moreover, the program instructions are readable and/or executable by a processor to cause the processor to perform a method which includes: calibrating, by the processor, a first block of storage space in memory; identifying, by the processor, a page in the calibrated first block having a highest RBER; and determining, by the processor, whether the RBER of the identified page is greater than an error correction code limit. In response to determining that the RBER of the identified page is not greater than the error correction code limit, a determination is made, by the processor, as to whether the RBER of the identified page is greater than a relocation limit. In response to determining that the RBER of the identified page is not greater than a relocation limit, another determination is made, by the processor, as to whether the first block has been excessively calibrated. Furthermore, in response to determining that the first block has been excessively calibrated, data in the first block is relocated, by the processor, to a second block of storage space in the memory.

In yet another general embodiment, a system includes: a processor; and logic integrated with and/or executable by the processor. The logic is configured to: calibrate, by the processor, a first block of storage space in memory; identify, by the processor, a page in the calibrated first block having a highest RBER; and determine, by the processor, whether the RBER of the identified page is greater than an error correction code limit. In response to determining that the RBER of the identified page is not greater than the error correction code limit, a determination is made, by the processor, as to whether the RBER of the identified page is greater than a relocation limit. In response to determining that the RBER of the identified page is not greater than a relocation limit, another determination is made, by the processor, as to whether the first block has been excessively calibrated. Furthermore, in response to determining that the first block has been excessively calibrated, data in the first block is relocated, by the processor, to a second block of storage space in the memory.

FIG. 1 illustrates a memory card 100, in accordance with one embodiment. It should be noted that although memory card 100 is depicted as an exemplary non-volatile data storage card in the present embodiment, various other types of non-volatile data storage cards may be used in a data storage system according to alternate embodiments. It follows that the architecture and/or components of memory card 100 are in no way intended to limit the invention, but rather have been presented as a non-limiting example.

Moreover, as an option, the present memory card 100 may be implemented in conjunction with features from any other embodiment listed herein, such as those described with reference to the other FIGS. However, such memory card 100 and others presented herein may be used in various applications and/or in permutations which may or may not be specifically described in the illustrative embodiments listed herein. Further, the memory card 100 presented herein may be used in any desired environment.

With continued reference to FIG. 1, memory card 100 includes a gateway 102, a general purpose processor (GPP) 112 (such as an ASIC, FPGA, CPU, etc.) connected to a GPP memory 114 (which may comprise RAM, ROM, battery-backed DRAM, phase-change memory PC-RAM, MRAM, STT-MRAM, etc., or a combination thereof), and a number of memory controllers 108, which include Flash controllers in the present example. Each memory controller 108 is connected to a plurality of NVRAM memory modules 104

(which may comprise NAND Flash or other non-volatile memory type(s) such as those listed above) via channels 106.

According to various embodiments, one or more of the controllers 108 may be or include one or more processors, and/or any logic for controlling any subsystem of the memory card 100. For example, the controllers 108 typically control the functions of NVRAM memory modules 104 such as, data writing, data recirculation, data reading, etc. The controllers 108 may operate using logic known in the art, as well as any logic disclosed herein, and thus may be considered as a processor for any of the descriptions of non-volatile memory included herein, in various embodiments.

Moreover, the controller 108 may be configured and/or programmable to perform or control some or all of the methodology presented herein. Thus, the controller 108 may be considered to be configured to perform various operations by way of logic programmed into one or more chips, modules, and/or blocks; software, firmware, and/or other instructions being available to one or more processors; etc., and combinations thereof.

Referring still to FIG. 1, each memory controller 108 is also connected to a controller memory 110 which preferably includes a cache which replicates a non-volatile memory structure according to the various embodiments described herein. However, depending on the desired embodiment, the controller memory 110 may be battery-backed DRAM, phase-change memory PC-RAM, MRAM, STT-MRAM, etc., or a combination thereof.

Figure 2:
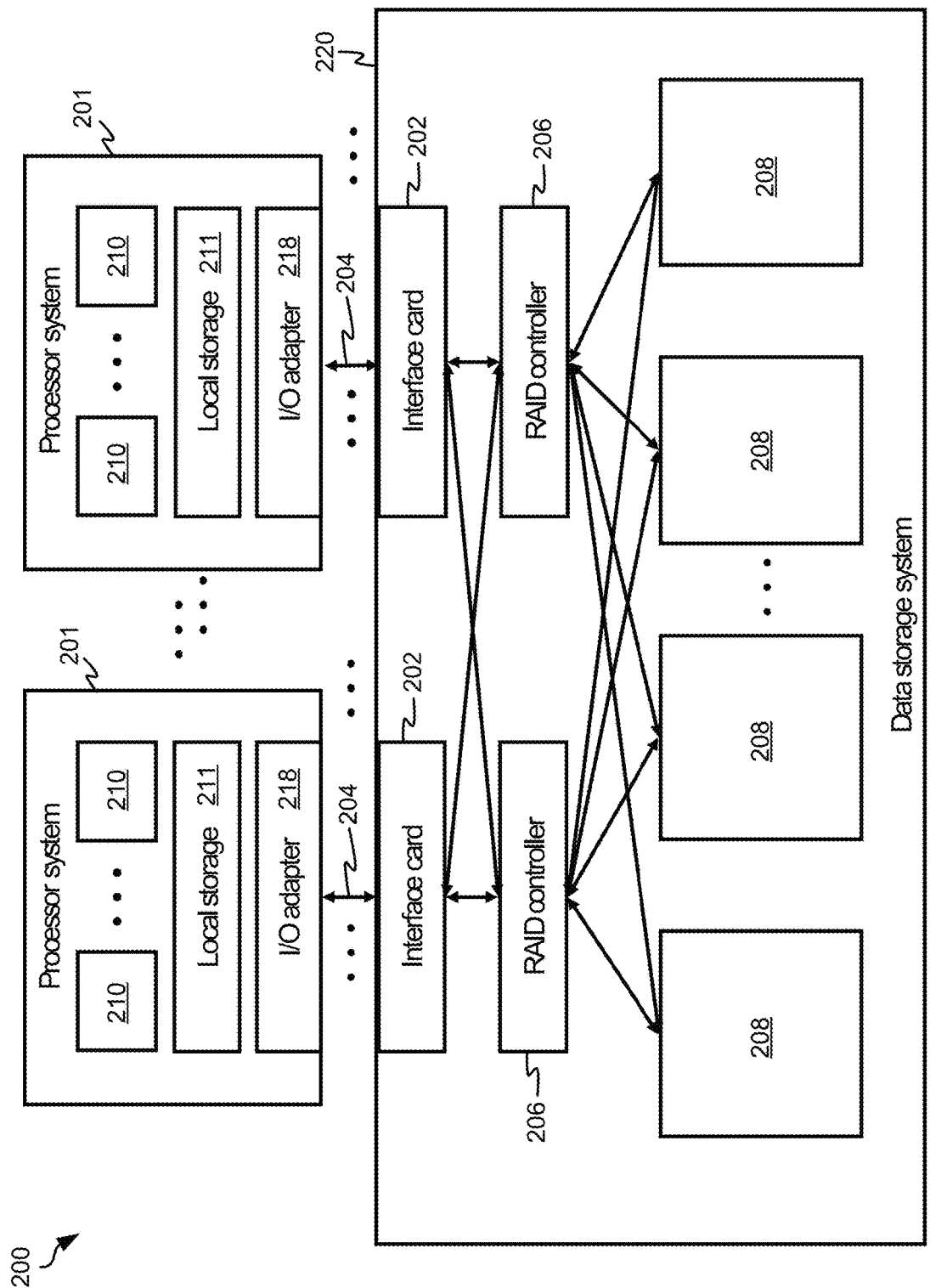
FIG. 2 is a diagram of a data storage system architecture, in accordance with one embodiment.

As previously mentioned, memory card 100 may be implemented in various types of data storage systems, depending on the desired embodiment. FIG. 2 illustrates a data storage system architecture 200 according to an exemplary embodiment which is in no way intended to limit the invention. Moreover, it should be noted that the data storage system 220 of FIG. 2 may include various components found in the embodiment of FIG. 1.

Looking to FIG. 2, the data storage system 220 comprises a number of interface cards 202 configured to communicate via I/O interconnections 204 to one or more processor systems 201. The data storage system 220 may also comprise one or more Redundant Array of Independent Disks (RAID) controllers 206 configured to control data storage in a plurality of non-volatile data storage cards 208. The non-volatile data storage cards 208 may comprise NVRAM, Flash memory cards, RAM, ROM, and/or some other known type of non-volatile memory.

The I/O interconnections 204 may include any known communication protocols, such as Fiber Channel (FC), FC over Ethernet (FCoE), Infiniband, Internet Small Computer System Interface (iSCSI), Transport Control Protocol/Internet Protocol (TCP/IP), Peripheral Component Interconnect Express (PCIe), etc., and/or any combination thereof.

The RAID controller(s) 206 in the data storage system 220 may perform a parity scheme similar to that employed by RAID-5, RAID-6, RAID-10, or some other suitable parity scheme, as would be understood by one of skill in the art upon reading the present descriptions.

Each processor system 201 comprises one or more processors 210 (such as CPUs, microprocessors, etc.), local data storage 211 (e.g., such as RAM 814 of FIG. 8, ROM 816 of FIG. 8, etc.), and an I/O adapter 218 configured to communicate with the data storage system 220.

Referring again to FIG. 1, memory controllers 108 and/or other controllers described herein (e.g., RAID controllers 206 of FIG. 2) may be able to perform various functions on stored data, depending on the desired embodiment. Specifically, memory controllers may include logic configured to perform any one or more of the following functions, which are in no way intended to be an exclusive list. In other words, depending on the desired embodiment, logic of a storage system may be configured to perform additional or alternative functions, as would be appreciated by one skilled in the art upon reading the present description.

Garbage Collection

Garbage collection in the context of SSD memory controllers of the present description may include the process of identifying blocks of data to be reclaimed for future usage and relocating all pages that are still valid therein. Moreover, depending on the specific controller and/or the respective garbage collection unit of operation, logic erase blocks (LEBs) may be identified for being reclaimed and/or relocated. Typically, one LEB corresponds to one block stripe, but alternative implementations may consider a fixed number of block stripes building a LEB as well.

A physical "block" represents a minimal unit that may be erased on non-volatile memory, e.g., such as NAND Flash memory, and thereby prepared for writing data thereto. However, a typical garbage collection unit of operation is often a multiple of the physical blocks of non-volatile memory, and is also referred to herein as a LEB. This is due to the fact that typically RAID-like parity information is added in LEBs. Therefore, in case of a page or block failure data can only be rebuilt when all blocks in the LEB are still holding data. Accordingly, the individual blocks from the garbage collection unit can only be erased either individually or in a single unit once all still valid data from all blocks in the LEB has been relocated successfully to new locations. Hence, the full garbage collection units are garbage-collected as a single unit. Moreover, the size of the LEB directly affects the garbage collection induced write amplification. The larger the LEB, the more likely it becomes that unrelated data are stored together in the LEB, and therefore more of the LEB data may have to be relocated upon garbage collection selection.

Frequently, blocks from different dies and/or Flash channels are grouped together, such that blocks from the same group can be read or written in parallel, thereby increasing overall bandwidth. It is also possible to combine the previous two methods, and to compose RAID stripes using blocks from different Flash channels that can be accessed in parallel.

It should also be noted that an LEB may include any multiple of the physical memory block, which is a unit of physical erasure. Moreover, the organization of memory blocks into LEBs not only allows for adding RAID-like parity protection schemes among memory blocks from different memory chips, memory planes and/or channels but also allows for significantly enhancing performance through higher parallelism. For instance, multiple non-volatile memory blocks may be grouped together in a RAID stripe. As will be appreciated by one skilled in the art upon reading the present description, RAID schemes generally improve reliability and reduce the probability of data loss.

According to an exemplary embodiment, which is in no way intended to limit the invention, memory controllers (e.g., see 108 of FIG. 1) may internally perform a garbage collection. As previously mentioned, the garbage collection may include selecting a LEB to be relocated, after which all data that is still valid on the selected LEB may be relocated (e.g., moved). After the still valid data has been relocated, the LEB may be erased and thereafter, used for storing new data. The amount of data relocated from the garbage collected LEB determines the write amplification. Moreover, an efficient way to reduce the write amplification includes implementing heat segregation.

Heat Segregation

In the present context, the "write heat" of data refers to the rate (e.g., frequency) at which the data is updated (e.g., rewritten with new data). Memory blocks that are considered "hot" tend to have a frequent updated rate, while memory blocks that are considered "cold" have an update rate slower than hot blocks.

Tracking the write heat of a logical page may involve, for instance, allocating a certain number of bits in the LPT mapping entry for the page to keep track of how many write operations the page has seen in a certain time period or window. Typically, host write operations increase the write heat whereas internal relocation writes decrease the write heat. The actual increments and/or decrements to the write heat may be deterministic or probabilistic.

Similarly, read heat may be tracked with a certain number of additional bits in the LPT for each logical page. To reduce meta-data, read heat can also be tracked at a physical block level where separate counters per block for straddling and non-straddling reads can be maintained. However, it should be noted that the number of read requests to and/or read operations performed on a memory block may not come into play for heat segregation when determining the heat of the memory block for some embodiments. For example, if data is frequently read from a particular memory block, the high read frequency does not necessarily mean that memory block will also have a high update rate. Rather, a high frequency of read operations performed on a given memory block may denote an importance, value, etc. of the data stored in the memory block.

By grouping memory blocks of the same and/or similar write heat values, write heat segregation may be achieved. In particular, write heat segregating methods may group write hot memory pages together in certain memory blocks while write cold memory pages are grouped together in separate memory blocks. Thus, a write heat segregated LEB tends to be occupied by either write hot or cold data.

The merit of write heat segregation is two-fold. First, performing a garbage collection process on a write hot memory block will prevent triggering the relocation of write cold data as well. In the absence of heat segregation, updates to write hot data, which are performed frequently, also results in the undesirable relocations of all write cold data collocated on the same LEB as the hot data being relocated. Therefore, the write amplification incurred by performing garbage collection is much lower for embodiments implementing write heat segregation.

Secondly, the relative write heat of data can be utilized for wear leveling purposes. For example, write hot data may be placed in healthier (e.g., younger) memory blocks, while write cold data may be placed on less healthy (e.g., older) memory blocks relative to those healthier memory blocks. Thus, the rate at which relatively older blocks are exposed to wear is effectively slowed, thereby improving the overall endurance of a given data storage system implementing write heat segregation.

Write Allocation

Write allocation includes placing data of write operations into free locations of open LEBs. As soon as all pages in a LEB have been written, the LEB is closed and placed in a pool holding occupied LEBs. Typically, LEBs in the occupied pool become eligible for garbage collection. The number of open LEBs is normally limited and any LEB being closed may be replaced, either immediately or after some delay, with a fresh LEB that is being opened.

During performance, garbage collection may take place concurrently with user write operations. For example, as a user (e.g., a host) writes data to a device, the device controller may continuously perform garbage collection on LEBs with invalid data to make space for the new incoming data pages. As mentioned above, the LEBs having the garbage collection being performed thereon will often have some pages that are still valid at the time of the garbage collection operation; thus, these pages are preferably relocated (e.g., written) to a new LEB.

Again, the foregoing functions are in no way intended to limit the capabilities of any of the storage systems described and/or suggested herein. Rather, the aforementioned functions are presented by way of example, and depending on the desired embodiment, logic of a storage system may be configured to perform additional or alternative functions, as would be appreciated by one skilled in the art upon reading the present description.

Figure 3:
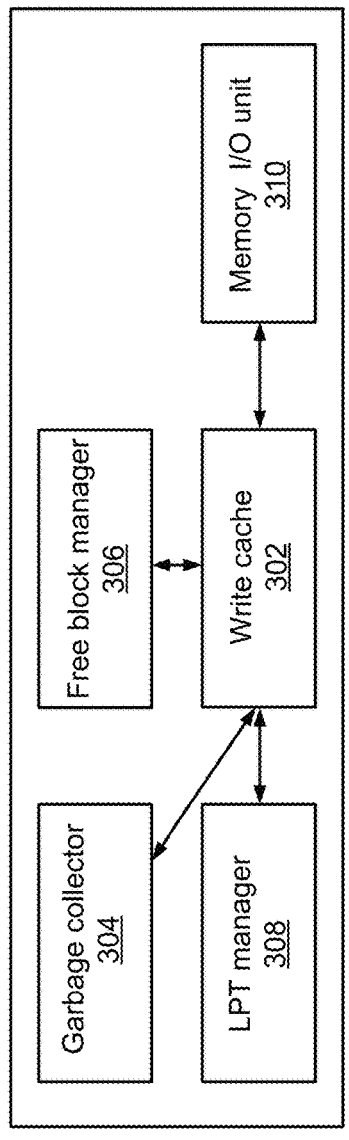
FIG. 3 is a system diagram, in accordance with one embodiment.

Referring now to FIG. 3, a system 300 is illustrated in accordance with one embodiment. As an option, the present system 300 may be implemented in conjunction with features from any other embodiment listed herein, such as those described with reference to the other FIGS. However, such system 300 and others presented herein may be used in various applications and/or in permutations which may or may not be specifically described in the illustrative embodiments listed herein. Further, the system 300 presented herein may be used in any desired environment, e.g., in combination with a controller.

As illustrated, system 300 includes a write cache 302 which is coupled to several other components, including garbage collector 304. As previously mentioned, garbage collector 304 may be used to free LEB units by relocating valid data and providing non-volatile memory blocks to be erased for later reuse. Thus, the garbage collector 304 may reclaim blocks of consecutive physical space, depending on the desired embodiment. According to an exemplary embodiment, block erase units may be used to keep track of and/or complete the erase of non-volatile memory blocks handed over by the garbage collector 304.

Write cache 302 is also coupled to free block manager 306 which may keep track of free non-volatile memory blocks after they have been erased. Moreover, as would be appreciated by one of ordinary skill in the art upon reading the present description, the free block manager 306 may build free stripes of non-volatile memory blocks from different lanes (e.g., block-stripes) using the erased free non-volatile memory blocks.

Referring still to FIG. 3, write cache 302 is coupled to LPT manager 308 and memory I/O unit 310. The LPT manager 308 maintains the logical-to-physical mappings of logical addresses to physical pages of memory. According to an example, which is in no way intended to limit the invention, the LPT manager 308 may maintain the logical-to-physical mappings of 4 KiB logical addresses. The memory I/O unit 310 communicates with the memory chips in order to perform low level operations, e.g., such as reading one or more non-volatile memory pages, writing a non-volatile memory page, erasing a non-volatile memory block, etc.

Figure 4A:
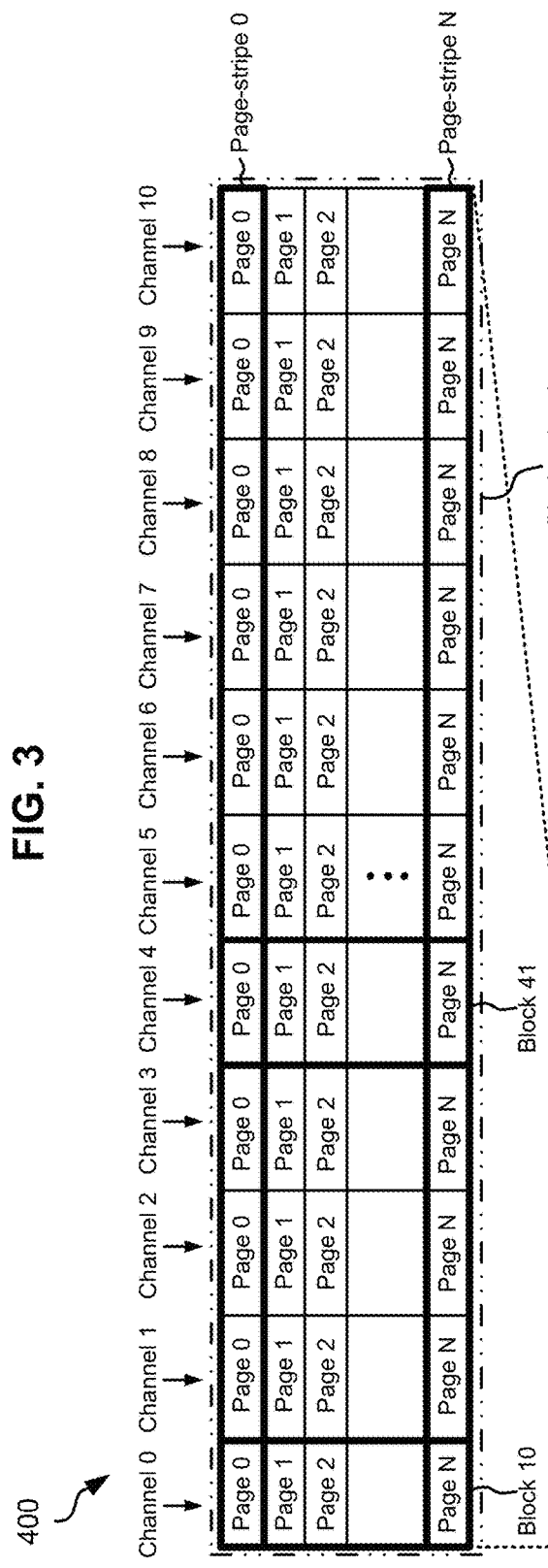
FIG. 4A is a conceptual diagram which includes a block-stripe and page-stripe, in accordance with one embodiment.

To better understand the distinction between block-stripes and page-stripes as used herein, FIG. 4A is a conceptual diagram 400, in accordance with one embodiment. LEBs are built from block stripes and typically a single block stripe is used to build a LEB. However, alternative embodiments may use multiple block stripes to form an LEB. As an option, the present conceptual diagram 400 may be implemented in conjunction with features from any other embodiment listed herein, such as those described with reference to the other FIGS. However, such conceptual diagram 400 and others presented herein may be used in various applications and/or in permutations which may or may not be specifically described in the illustrative embodiments listed herein. Further, the controller conceptual diagram 400 presented herein may be used in any desired environment. Thus, the exemplary non-volatile memory controller conceptual diagram 400 of FIG. 4A may be implemented in a cache architecture. However, depending on the desired embodiment, the conceptual diagram 400 of FIG. 4A may be implemented in defining the organization of data stored in non-volatile memory. Accordingly, both implementations are described in turn below.

Non-Volatile Memory

Looking now to FIG. 4A, the conceptual diagram 400 includes a set of M+1 aggregated planes labeled "Plane 0" through "Plane M". An aggregated plane consists of all physical planes with the same plane index on different channels. It should be noted that aggregated planes are also referred to herein simply as planes.

When implemented with data stored in non-volatile memory, each physical plane on a channel may include a large set of blocks, e.g., typically in the order of 1024, 2048 or more. Moreover, one or more physical planes may also include several additional blocks which may be used as replacement blocks for bad blocks (e.g., blocks performing poorly, blocks having undesirable characteristics, etc.).

In each plane of non-volatile memory, a single block from each channel forms a respective block-stripe. It follows that a number of block-stripes supported by a given embodiment of non-volatile memory may be determined by the number of blocks per plane and the number of planes.

In the exploded view of Plane 0, the conceptual diagram 400 further illustrates a single block-stripe (Block-stripe 0) out of the set of block-stripes supported in the remainder of the planes. Block-stripe 0 of plane 0 is shown as including 11 blocks, one block from each channel labeled "Channel 0" through "Channel 10". It should be noted that the association of blocks to block-stripe can change over time as block-stripes are typically dissolved after they have been garbage collected. Erased blocks may be placed in free block pools, whereby new block-stripes are assembled from blocks in the free block pools when write allocation requests fresh block-stripes. For example, looking to conceptual diagram 400, Block 10 from Channel 0 and Block 41 from Channel 4 are currently associated with the illustrated Block-stripe 0 of Plane 0. Furthermore, the illustrated Block-stripe 0 holds N+1 page-stripes and each block therefore holds N+1 pages labeled "Page 0" through "Page N".

Cache Architecture

Referring still to FIG. 4A, each block of pages illustrated in the exploded view of aggregated Plane 0 may constitute a unique block from one channel when implemented in a cache architecture. Similarly, each channel contributes a single, individual block which form a block-stripe. For example, looking to conceptual diagram 400, Block 10 from Channel 0 includes all pages (Page 0 through Page N) therein, while Block 41 from Channel 4 corresponds to all pages therein, and so on.

In the context of a memory controller, e.g., which may be capable of implementing RAID at the channel level, a block-stripe is made up of multiple blocks which amount to a stripe of blocks. Looking still to FIG. 4A, the multiple blocks of aggregated Plane 0 constitute Block-stripe 0. While all blocks in a block-stripe typically belong to the same aggregated plane, in some embodiments one or more blocks of a block-stripe may belong to different physical planes. It follows that each aggregated plane may include one or more block-stripe. Thus, according to an illustrative embodiment, Block 0 through Block 10 from different physical planes may constitute a block-stripe.

Regardless of whether the conceptual diagram 400 of FIG. 4A is implemented with non-volatile memory and/or a cache architecture, in different embodiments, the number of pages in each block and/or the number of channels in each plane may vary depending on the desired embodiment. According to an exemplary embodiment, which is in no way intended to limit the invention, a block may include 1024 pages, but could include more or less in various embodiments. Analogously, the number of channels per plane and/or the number of planes may vary depending on the desired embodiment.

Referring still to FIG. 4A, all pages in a block-stripe with the same page index denote a page-stripe. For example, Page-stripe 0 includes the first page (Page 0) of each channel in Block-stripe 0 of Plane 0. Similarly, Page-stripe N includes the last page (Page N) of each channel in Block-stripe 0 of Plane 0.

Figure 4A:
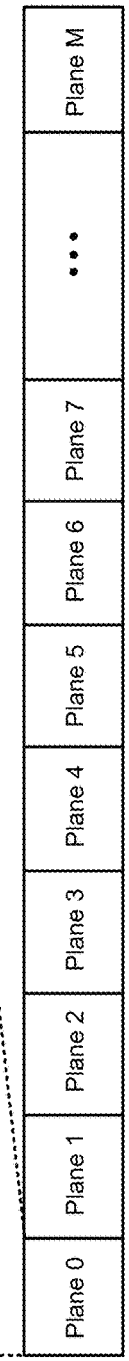
Figure 4B:
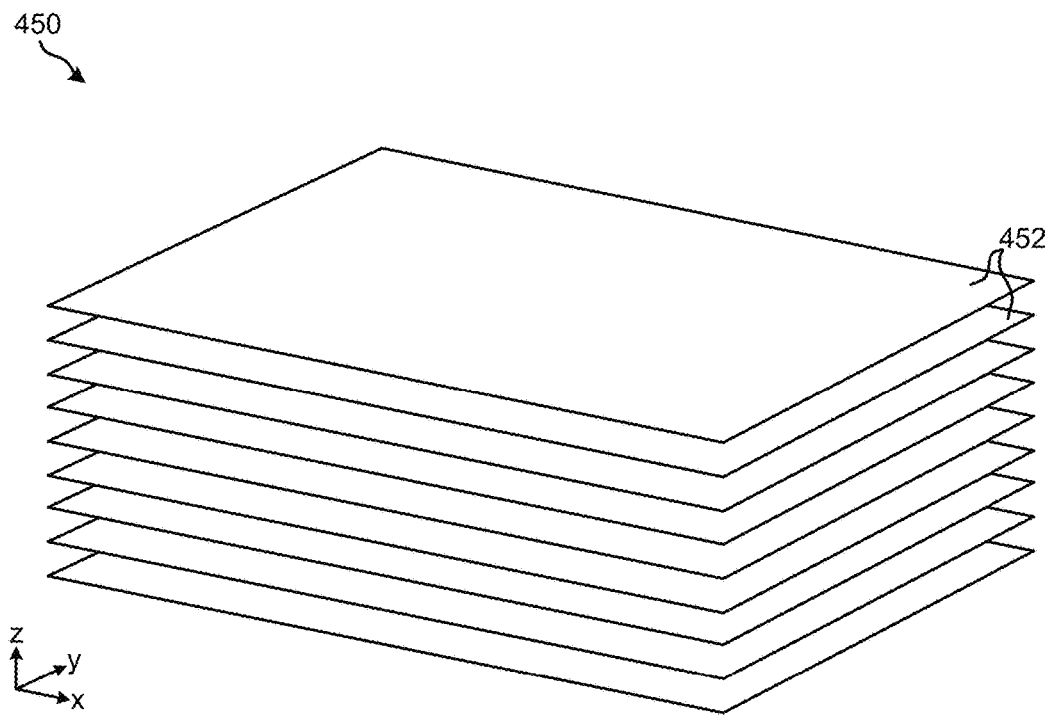
FIG. 4B is a partial perspective view of a 3-D non-volatile memory structure, in accordance with one embodiment.

The general storage architecture illustrated in the conceptual diagram 400 of FIG. 4A is also implemented by using 3-D memory structures in some approaches. For instance, FIG. 4B depicts a representational view of a 3-D non-volatile memory structure 450, in accordance with one embodiment. As an option, the present structure 450 may be implemented in conjunction with features from any other embodiment listed herein, such as those described with reference to the other FIGS., such as FIG. 4A. However, such structure 450 and others presented herein may be used in various applications and/or in permutations which may or may not be specifically described in the illustrative embodiments listed herein. Further, the structure 450 presented herein may be used in any desired environment. Thus FIG. 4B (and the other FIGS.) may be deemed to include any possible permutation.

As shown, each layer 452 of the 3-D non-volatile memory structure 450 extends along both the x-axis and the y-axis. Each of these layers 452 include a plurality of storage components (not shown), such as voltage supply lines, sensor stacks, transistors, etc., which are used to implement the non-volatile memory devices of the general storage architecture illustrated in the conceptual diagram 400 of FIG. 4A, e.g., as would be appreciated by one skilled in the art after reading the present description. Moreover, the various layers 452 are arranged in a stacked fashion along the z-axis in order to increase storage density and efficiency, e.g., by implementing shared wordlines. Cells from different bitlines along a wordline (typically in the x or y dimension of FIG. 4B) are logically combined to form pages: In TLC, each wordline in a block contains 3 physical pages (i.e., a lower page, an upper page, and an extra page) and a wordline typically belongs to one particular layer in the z dimension (perpendicular to the x-y plane). For a particular block, which is formed from a grid of cells connected by wordlines and bitlines, the number of wordlines residing on the same layer is typically small. Therefore, a block can be formed from wordlines of all layers 452. Moreover, wordlines as well as pages in the same block may reside on different layers 452.

Again, due to cycling, retention, read disturb, program disturb, etc., or other mechanisms that may be specific to the NAND storage technology (e.g., floating gate or charge trap), process technology (e.g., 2-D or 3-D), scaling node, etc., or other specific design factors, the programmed threshold voltage distributions in memory may change with writing and erasing data (cycling), reading data (read disturb), time (retention), etc., in a slow or fast manner. In other words, bit error rates (BERs) for Flash memory blocks increase with time and use. As memory blocks are used, each program/erase (P/E) cycle performed on the blocks causes damage, which in turn increases the corresponding BER.

Although increases to BERs are sometimes irreversible (e.g., such as those caused by prolonged program-erase cycles), increases to BERs caused by events such as retention and/or read disturbances are not permanent in the sense that the memory blocks affected are not irreversibly damaged. Rather, this unfavorable decline in performance is remedied when the corresponding memory blocks are erased and/or re-calibrated. Thus, block calibration, also known as read voltage shifting, is an important aspect of enhancing endurance and retention for storage systems, e.g., particularly enterprise-level Flash systems, by reducing the RBER experienced. This block calibration corresponds to the read voltages and refers to algorithms that are able to track the changes of the threshold voltages, thereby significantly improving the performance consistency in the respective device by reducing read tail latency which would otherwise result from error recovery mechanism invocations.

Moreover, adjustments to the read voltages are applied during a read command accordingly. It follows that the threshold voltage represents the voltage required to turn on the transistor of a given Flash memory cell and its value depends on the amount of charge stored during programming. However, the read voltage is a bias voltage, the value of which is typically between the threshold voltage of two adjacent logical states, e.g., as is explained in further detail below in FIG. 5.

Figure 5:
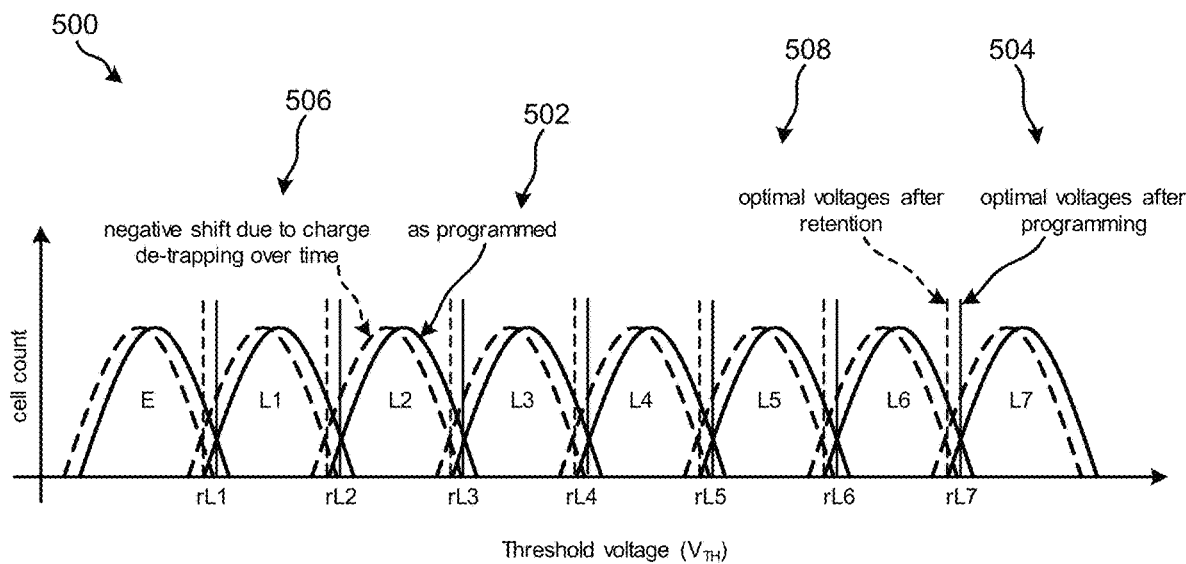
FIG. 5 is a graph which illustrates the threshold voltage shifting phenomenon, in accordance with one embodiment.

Referring momentarily to FIG. 5, a graph 500 illustrating the threshold voltage shifting phenomenon is illustrated in accordance with an example. The x-axis of the graph 500 represents the programmed threshold voltage VTH, while the y-axis represents the corresponding cell count of a TLC NAND memory block. In TLC NAND, each memory cell stores 3 bits of information, therefore, the VTH distributions correspond to 8 possible discrete levels (E, L1, . . . , L7). The solid distributions 502 indicate the VTH levels after programming. The vertical solid lines 504 indicate the read voltages (rL1, . . . , rL7) that are optimal for the VTH distributions 502. The dashed distributions 506 indicate a negative shift of the VTH levels due to charge loss over time. Because of this negative shift to lower voltages, the read voltages 504 are no longer optimal. Indeed, a negative offset must be applied to the read voltages in order to account for the changes of the VTH distributions from 502 to 506. The vertical dashed lines 508 indicate the read voltages (rL1, . . . , rL7) that are optimal during retention for the VTH distributions in 506. In general, each of the 8 levels (E, L1, . . . , L7) shown in the figure may have a different VTH shifts and thus, each of the 7 read voltages (rL1, . . . , rL7) may have a different optimal shift.

Accordingly, the read voltage shift values are preferably determined shortly after a block has been written to and/or periodically thereafter. The threshold voltage can be considered an index of the memory state, as determined by measuring the source-drain current when a control gate bias is applied to the memory cell. Typically, upon a read operation, a read voltage between adjacent nominal threshold voltages is used to determine the memory cell state. As the threshold voltage value of the memory cell changes (as explained above), the read voltage applied during a read operation is preferably shifted using a read voltage shift value to obtain optimal readout conditions and minimize BERs. Subsequently, the optimal read voltage shift values may be updated periodically, e.g., in a background health check.

As mentioned above, although increases to BERs are irreparable for some blocks of storage space (e.g., such as those caused by prolonged program-erase cycles), increases to BERs caused by events such as retention and/or read disturbances are transient in the sense that the blocks which are affected are not irreversibly damaged. Rather, this unfavorable decline in BERs is remedied when the corresponding memory blocks are erased, programmed, and re-calibrated. It follows that blocks experiencing transient BER increases may be remedied by being erased, programmed, and re-calibrated, and yet the same erase, program, and re-calibration operation will essentially have no effect on blocks experiencing irreversibly increased BERs.

However, conventional processes have been unable to distinguish irreversibly damaged blocks from blocks which have only experienced a transient increase in BER. Accordingly, conventional processes have suffered from significant inefficiencies, not only in the process of identifying portions of memory which would benefit from calibration, but also in performing the calibration process itself, as numerous blocks would often be unnecessarily erased, programmed, and re-calibrated, and potentially prematurely retired due to transiently elevated error counts soon after programming. Yet numerous other blocks would often be unnecessarily re-calibrated again and again in some situations, thereby resulting in a calibration overload that can cause other blocks to not be calibrated in time and thus may result in complete failures to read data. Moreover, in modern 3-D TLC and QLC NAND Flash, the number of pages in a block and the number of blocks in a package have been substantially increased with respect to previous generation 2-D NAND Flash. As a result, it may take longer before a particular page or block is inspected during the regular background process.

In sharp contrast to the aforementioned shortcomings experienced by conventional processes, various ones of the embodiments included herein prevent the excessive consumption of internal bandwidth by avoiding the performance of unnecessary calibration operations for certain blocks without increasing the risk of experiencing an uncorrectable read error as a result. Specifically, some of the embodiments described herein are able to accurately identify blocks which are experiencing transient effects of limited data retention performance. In different approaches, this identification is made based on runtime statistics, e.g., such as calibration frequency, total number of calibrations, age, read error rate after calibration, etc. for each of the respective blocks. As a result, the number of unnecessary block calibrations performed is significantly reduced, while also maintaining efficient memory utilization and desirable RBER levels, e.g., as will be described in further detail below.

Figure 6A:
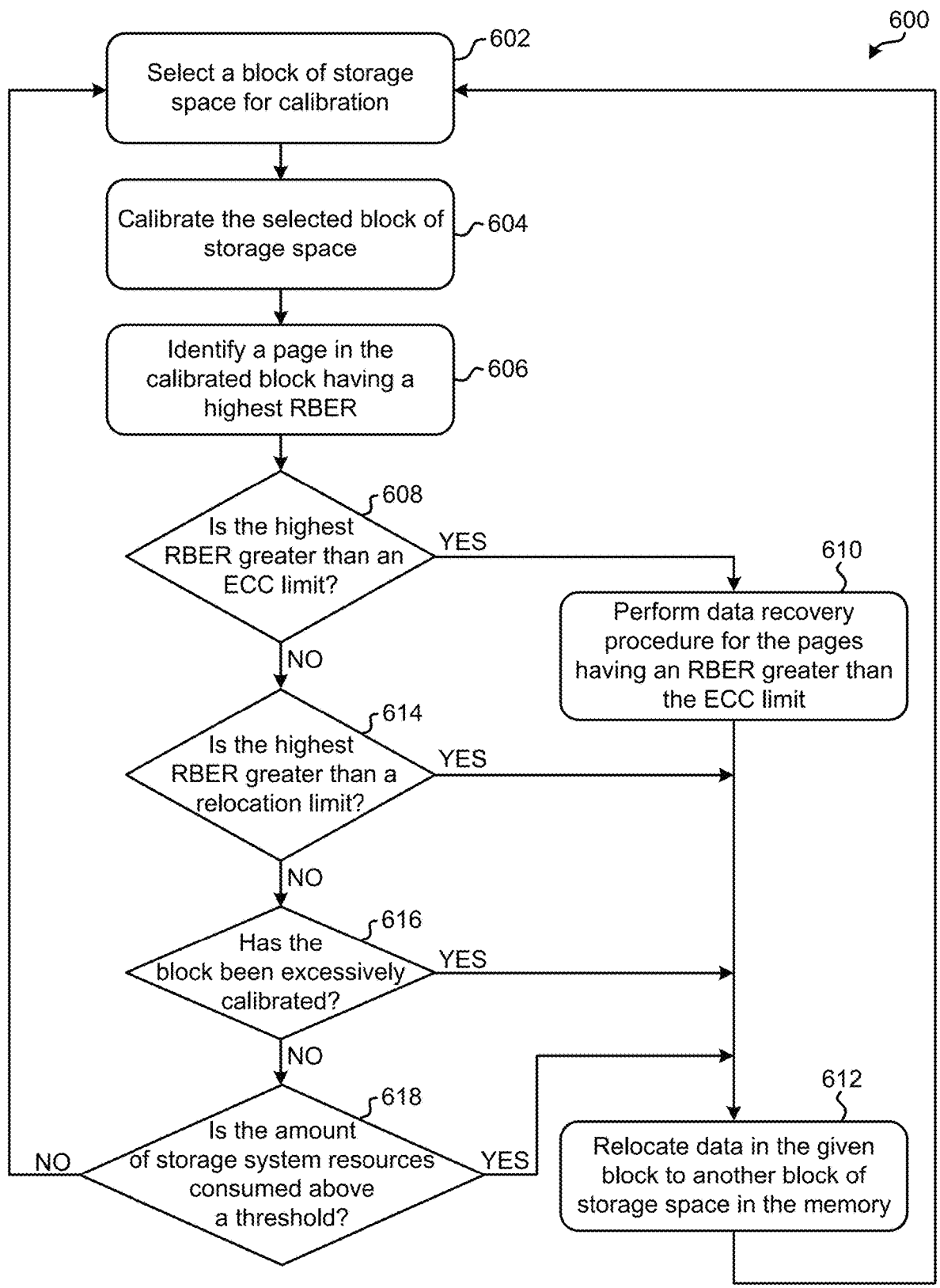
FIG. 6A is a flowchart of a method, in accordance with one embodiment.

Referring now to FIG. 6A, a flowchart of a method 600 for determining whether to relocate the data stored in a block of storage space is shown according to one embodiment. The method 600 may be performed in accordance with the present invention in any of the environments depicted in FIGS. 1-5, among others, in various embodiments. For instance, any of the processes included in method 600 may be performed with respect to blocks of storage space in 3-D TLC NAND Flash, 3-D QLC NAND Flash, 2-D NAND Flash, etc., or any other desired type of memory. Furthermore, more or less operations than those specifically described in FIG. 6A may be included in method 600, as would be understood by one of skill in the art upon reading the present descriptions.

Each of the steps of the method 600 may be performed by any suitable component of the operating environment. For example, in various embodiments, the method 600 may be partially or entirely performed by a controller (e.g., Flash controller), a processor, a computer, etc., or some other device having one or more processors therein. Thus, in some embodiments, method 600 may be a computer-implemented method. It should also be noted that the terms computer, processor and controller may be used interchangeably with regards to any of the embodiments herein, such components being considered equivalents in the many various permutations of the present invention.

Moreover, for those embodiments having a processor, the processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6A, operation 602 of method 600 includes selecting a block of storage space for calibration. In some approaches, a block of storage space is selected as part of an ongoing data scrubber process running in the background, unbenounced to standard memory operations, e.g., such as data read and/or data write operations. In other approaches, a block of storage space can be selected on demand. For instance, a block of storage space identified as experiencing certain performance characteristics as a result of a probe read operation may be selected for calibration. It follows that a block of storage space may be selected in any desired manner.

Operation 604 further includes calibrating the block of storage space actively or passively selected in operation 602. The act of actually calibrating (or re-calibrating) the block of storage space may implement any processes which would be apparent to one skilled in the art after reading the present description. For instance, a plurality of electrical signals may be used to determine the read voltage of the block and make adjustments as needed.

Method 600 proceeds to operation 606, which includes identifying a page in the calibrated block having a highest (e.g., "max" or "maximum") RBER. It is preferred that the page having the highest RBER is identified following the calibration of the block, as the calibration operation is able to revert transient shifts in bit error rates. In other words, the calibration performed in operation 604 is able to revert the RBERs of the pages in the block of storage space. Thus, it is likely that the page identified as having the highest RBER in operation 606 is not merely temporarily experiencing a high RBER.

Decision 608 further includes determining whether the RBER of the identified page is greater than an ECC limit. As mentioned above, the page that is identified has the highest RBER of all pages in the given block of storage space. In other words, the page identified in operation 606 is the worst performing page of all pages included in the block of storage space as measured with respect to RBER. Comparing the worst performing page of a given block to an ECC limit gives an accurate representation of whether the block as a whole is capable of performing at a level which at least ensures that data is still capable of being accessed therefrom, e.g., using ECC. It should also be noted that the ECC limit is unrelated to an error count margin (ECM) limit which may otherwise be implemented in the system, e.g., as would be appreciated by one skilled in the art after reading the present description.

In response to determining that the RBER of the identified page is greater than an ECC limit, method 600 proceeds from decision 608 to operation 610. There, operation 610 includes using a data recovery procedure to recover the data in the given block. As mentioned above, the ECC limit effectively represents an upper boundary of what data the ECC is capable of repairing. In other words, a block having an RBER which exceeds the ECC limit includes so many data errors that the ECC is not even capable of recovering all of the data. Depending on the approach, the data recovery procedure implemented in operation 610 to recover the data in the block of storage space varies depending on the approach. For instance, RAID implemented in the memory itself, e.g., in the same Flash card as the block being evaluated, is used in some approaches to perform the data handling in the data recovery process. In other approaches, system level RAID is accessed and implemented in order to perform the data handling of the data recovery process. It follows that in some approaches, the data recovery procedure includes performing a RAID recovery operation. However, any desired type of data recovery processes which would be apparent to one skilled in the art after reading the present description may be implemented.

From operation 610, method 600 proceeds to operation 612 which includes actually relocating data in the given block to another block of storage space in the memory. It should be noted that for approaches where method 600 proceeds to operation 612 from operation 610, the data which is relocated to another block of storage space is actually the data recovered in operation 610.

The block to which the data is relocated may be selected according to any desired scheme. For instance, in some approaches the data is relocated to a block of storage space randomly selected from a pool of available blocks. In other approaches, the data is relocated to a block of storage space selected from a buffer in a last-in-first-out (LIFO) or first-in-first-out (FIFO) manner. In still other approaches, the data is relocated to an available (e.g., empty) block of storage space determined as having experienced a fewest number of program-erase cycles. The data can also be transferred from the given block to the second block of storage space using any desired processes and/or in any order, e.g., as would be appreciated by one skilled in the art after reading the present description. Moreover, by erasing the data from the given block of storage space in response to the data being transferred to another block, the transient increase to the RBER experienced by the block is mitigated, thereby allowing the newly erased block to be returned to a pool of available blocks.

From operation 612, method 600 returns to operation 602 such that another block of storage space may be selected for calibration. It follows that the various processes included in method 600 may be repeated in an iterative fashion, e.g., according to a data scrubber process. In other words, any of the processes in method 600 may be repeated any number of times in order to evaluate any number of blocks of storage space.

Returning now to decision 608, method 600 alternatively proceeds to decision 614 in response to determining that the RBER of the identified page is not greater than the ECC limit. There, decision 614 includes determining whether the RBER of the identified page is greater than a relocation limit. Even though the RBER of a "worst performing" page in a given block of storage space is determined as being below an ECC limit, the RBER may be close enough to the ECC limit that relocating the data stored in the given block is still preferred. It follows that the relocation limit is sufficiently close to the ECC limit in typical approaches, e.g., such as between about 85% and about 99% of the ECC limit, more preferably between about 90% and about 95% of the ECC limit, but could be closer to or farther away from the ECC limit depending on the desired approach.

As shown, method 600 proceeds to operation 612 in response to determining that the RBER of the identified page is greater than the relocation limit. Again, operation 612 includes actually relocating data in the given block to another block of storage space in the memory, e.g., according to any of the approaches described above. As a result, the poorly performing block of storage space may be erased in response to the data being transferred to another block, thereby mitigating the transient increase to the RBER experienced by the block, and allowing the newly erased block to be returned to a pool of available blocks.

However, method 600 proceeds to decision 616 in response to determining that the RBER of the identified page is not greater than the relocation limit. There, decision 616 includes determining whether the given block has been excessively calibrated. As previously mentioned, increases to BERs caused by some events, e.g., such as retention and/or read disturbances are transient in the sense that the blocks which are affected can be improved. Thus, this unfavorable decline in performance can be remedied by erasing and re-calibrating the given block of storage space. However, block of storage space may sometimes be caught in a loop which involves repeatedly re-calibrating the block in an attempt to reduce the corresponding RBER.

Thus, by determining whether the given block has been excessively calibrated, decision 616 is able to identify blocks of storage space which are underperforming despite having RBERs that are below the ECC limit and/or the relocation limit. Although the RBER of a block identified in decision 616 may be below the ECC limit and the relocation limit, it is advantageous to relocate data in the identified block to another block of storage space such that efficient performance of the system as a whole is maintained and resources, e.g., such as computational throughput, operating power, system bandwidth, etc., are conserved.

It should also be noted that with respect to the present description, "excessively calibrated" may differ depending on the desired approach. For instance, in some approaches the frequency at which a given block is re-calibrated determines whether the block has been excessively calibrated. Yet in other approaches, the number of times a given block has been re-calibrated in a given period of time determines whether the block has been excessively calibrated. According to an example, which is in no way intended to limit the invention, a block of storage space which has been calibrated more than five times in a 24 hour period is identified as being excessively calibrated. In still other approaches, the total number of times a given block has been re-calibrated overall determines whether the block has been excessively calibrated. According to another example, which is again in no way intended to limit the invention, the total number of re-calibrations that a given block is expected to experience under normal conditions is determined based on the maximum number of calibrations performed in a 24 hour period for the block multiplied by the anticipated number of days between erasures of the block. In other approaches, the data retention time is used to determine whether the block has been excessively calibrated. For example, a given block of storage space may have a maximum data retention time of three months which can be used to compute an anticipated number of re-calibrations in that amount of time, e.g., as described above. The actual frequency at which re-calibrations occur, total number of re-calibrations, or any other metric used to determine whether a given block of storage space is excessively calibrated varies, e.g., depending on the desired approach.

Figure 6B:
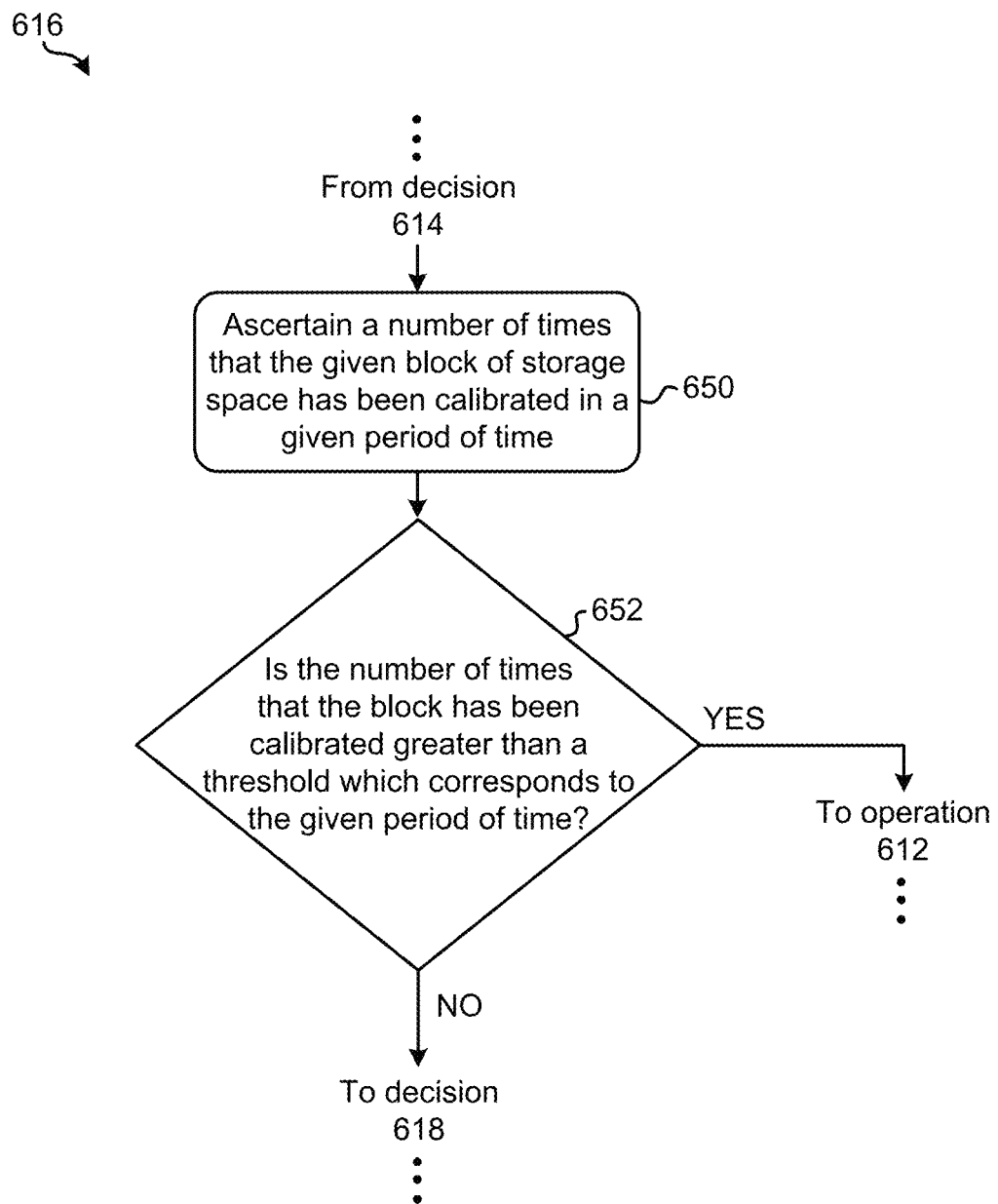
FIG. 6B is a flowchart of sub-processes for one of the operations in the method of FIG. 6A, in accordance with one embodiment.

Looking momentarily to FIG. 6B, exemplary sub-processes of determining whether the first block has been excessively calibrated are illustrated in accordance with one embodiment, one or more of which may be used to perform decision 616 of FIG. 6A. However, it should be noted that the sub-processes of FIG. 6B are illustrated in accordance with one embodiment which is in no way intended to limit the invention.

As shown, sub-operation 650 includes ascertaining a number of times that the given block of storage space has been calibrated in a given period of time. In other words, sub-operation 650 includes determining a number of times that the given block has been calibrated since it was originally programmed, in the last day, over a week, etc., depending on the desired embodiment. Moreover, decision 652 includes determining whether the number of times that the block has been calibrated is greater than a threshold which corresponds to the given period of time.

In response to determining that the number of times that the block has been calibrated is greater than the threshold which corresponds to the given period of time, the flowchart proceeds to operation 612 as shown. However, in response to determining that the number of times that the block has been calibrated is not greater than the threshold which corresponds to the given period of time, the flowchart of FIG. 6B proceeds to decision 618 as shown.

Accordingly, returning to FIG. 6A, method 600 proceeds directly to operation 612 in response to determining that the block has been excessively calibrated. As a result, the data in the given block is relocated to another block of storage space in the memory such that the excessively calibrated block may be erased, e.g., according to any of the approaches described above. However, method 600 alternatively proceeds to decision 618 in response to determining that the block has not been excessively calibrated. There, decision 618 includes determining whether an amount of storage system resources consumed in the process of calibrating the block of storage space (e.g., see operation 604) is above a threshold. In other words, decision 618 includes determining whether calibrating the block of storage space was undesirably inefficient in the first place. For instance, calibrating certain blocks of storage space consumes an undesirable amount of system resources, e.g., such as computational throughput, operating power, system bandwidth, etc. This inefficiency may result from a number of factors, e.g., such as a number of program-erase cycles the block has experienced.

In response to determining that the amount of storage system resources consumed in the process of calibrating the block of storage space is above a threshold, method 600 proceeds to operation 612. However, in response to determining that the amount of storage system resources consumed in the process of calibrating the block of storage space is not above the threshold, method 600 returns directly to operation 602. Thus, another block of storage space may be selected for calibration, and the various processes included in method 600 may be repeated in an iterative fashion, e.g., according to a data scrubber process. It should also be noted that decision 618 is optional in some approaches. Thus, method 600 may be performed without determining whether a currently examined block of storage space consumed an undesirably high amount of resources during the calibration thereof.

In addition to the processes described above, blocks of storage space determined as performing undesirably may be marked or otherwise identified (e.g., in a lookup table) for future use. For example, a block of storage space determined as including a page which has a RBER higher than the ECC limit may be further evaluated to determine whether repair processes are capable of improving performance. In response to determining that the block of storage space is uncorrectable, it may further be marked as retired and decommissioned from any further use.

It should also be noted that "greater than a limit" or "greater than a threshold" is in no way intended to limit the invention. Rather than determining whether a value is greater than a threshold and/or a limit, equivalent determinations may be made, e.g., as to whether a value is in a predetermined range, whether a value is outside a predetermined range, whether an absolute value is above a threshold, whether a value is below a threshold, etc., depending on the desired approach.

It follows that various ones of the embodiments included herein prevent the excessive consumption of internal bandwidth by avoiding the performance of unnecessary calibration operations for certain blocks without increasing the risk of experiencing an uncorrectable read error as a result. Specifically, some of the embodiments described herein are able to accurately identify blocks which are experiencing transient effects of limited data retention performance. In different approaches, this identification is made based on runtime statistics, e.g., such as calibration frequency, total number of calibrations, age, read error rate after calibration, etc. for each of the respective blocks. As a result, blocks experiencing transient setbacks to data retention capabilities are accurately identified, and the number of unnecessary block calibrations performed is significantly reduced, all while maintaining efficient memory utilization and desirable RBER levels.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Figure 7:
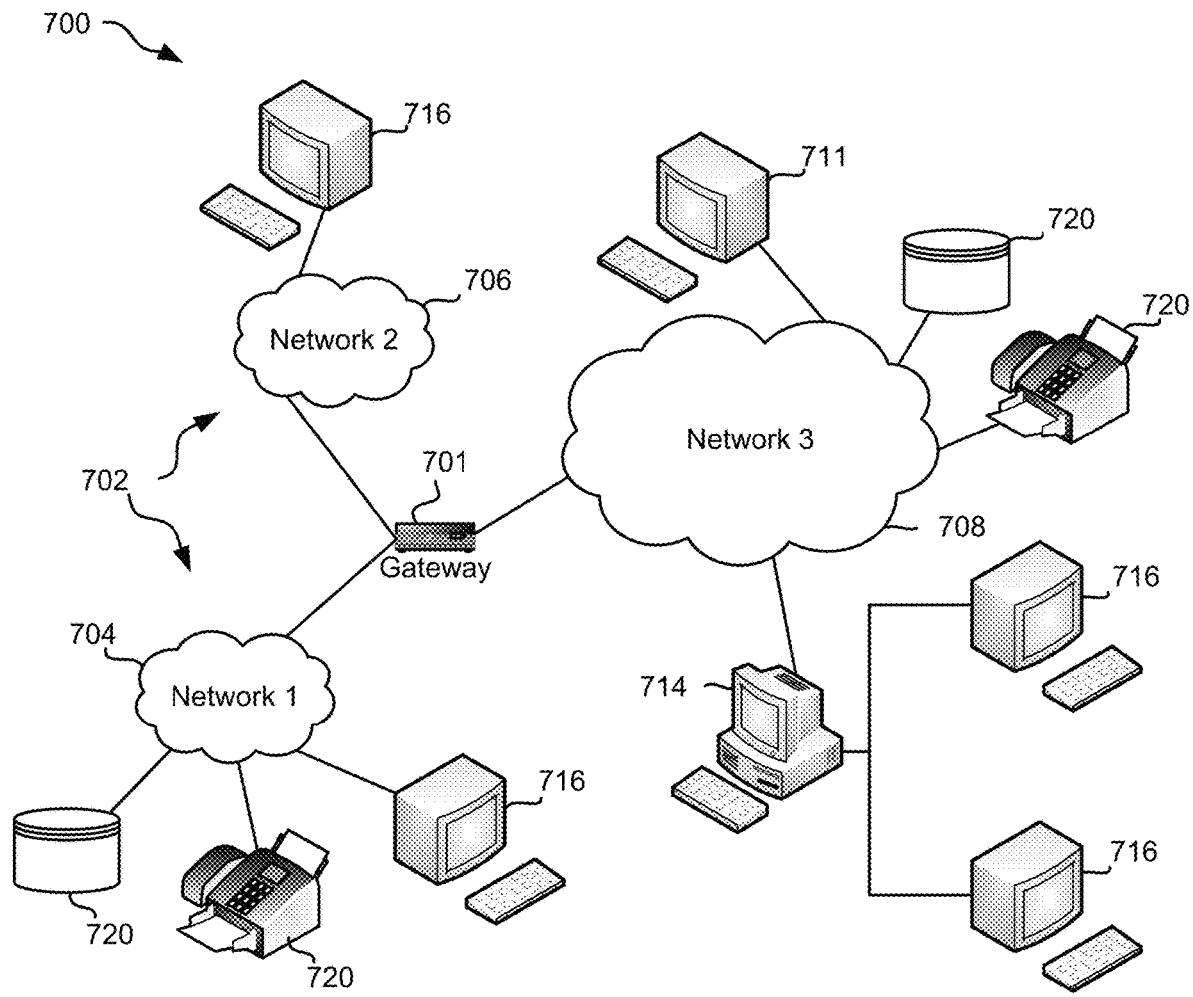
FIG. 7 is a network architecture, in accordance with one embodiment.

FIG. 7 illustrates a network architecture 700, in accordance with one embodiment. As shown in FIG. 7, a plurality of remote networks 702 are provided including a first remote network 704 and a second remote network 706. A gateway 701 may be coupled between the remote networks 702 and a proximate network 708. In the context of the present network architecture 700, the networks 704, 706 may each take any form including, but not limited to a LAN, a WAN such as the Internet, public switched telephone network (PSTN), internal telephone network, etc.

In use, the gateway 701 serves as an entrance point from the remote networks 702 to the proximate network 708. As such, the gateway 701 may function as a router, which is capable of directing a given packet of data that arrives at the gateway 701, and a switch, which furnishes the actual path in and out of the gateway 701 for a given packet.

Further included is at least one data server 714 coupled to the proximate network 708, and which is accessible from the remote networks 702 via the gateway 701. It should be noted that the data server(s) 714 may include any type of computing device/groupware. Coupled to each data server 714 is a plurality of user devices 716. Such user devices 716 may include a desktop computer, laptop computer, handheld computer, printer, and/or any other type of logic-containing device. It should be noted that a user device 711 may also be directly coupled to any of the networks, in some embodiments.

A peripheral 720 or series of peripherals 720, e.g., facsimile machines, printers, scanners, hard disk drives, networked and/or local data storage units or systems, etc., may be coupled to one or more of the networks 704, 706, 708. It should be noted that databases and/or additional components may be utilized with, or integrated into, any type of network element coupled to the networks 704, 706, 708. In the context of the present description, a network element may refer to any component of a network.

According to some embodiments, methods and systems described herein may be implemented with and/or on virtual systems and/or systems which emulate one or more other systems, such as a UNIX system which virtually hosts a MICROSOFT WINDOWS environment, etc. This virtualization and/or emulation may be enhanced through the use of VMWARE software, in some embodiments.

In other embodiments, one or more networks 704, 706, 708, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 8:
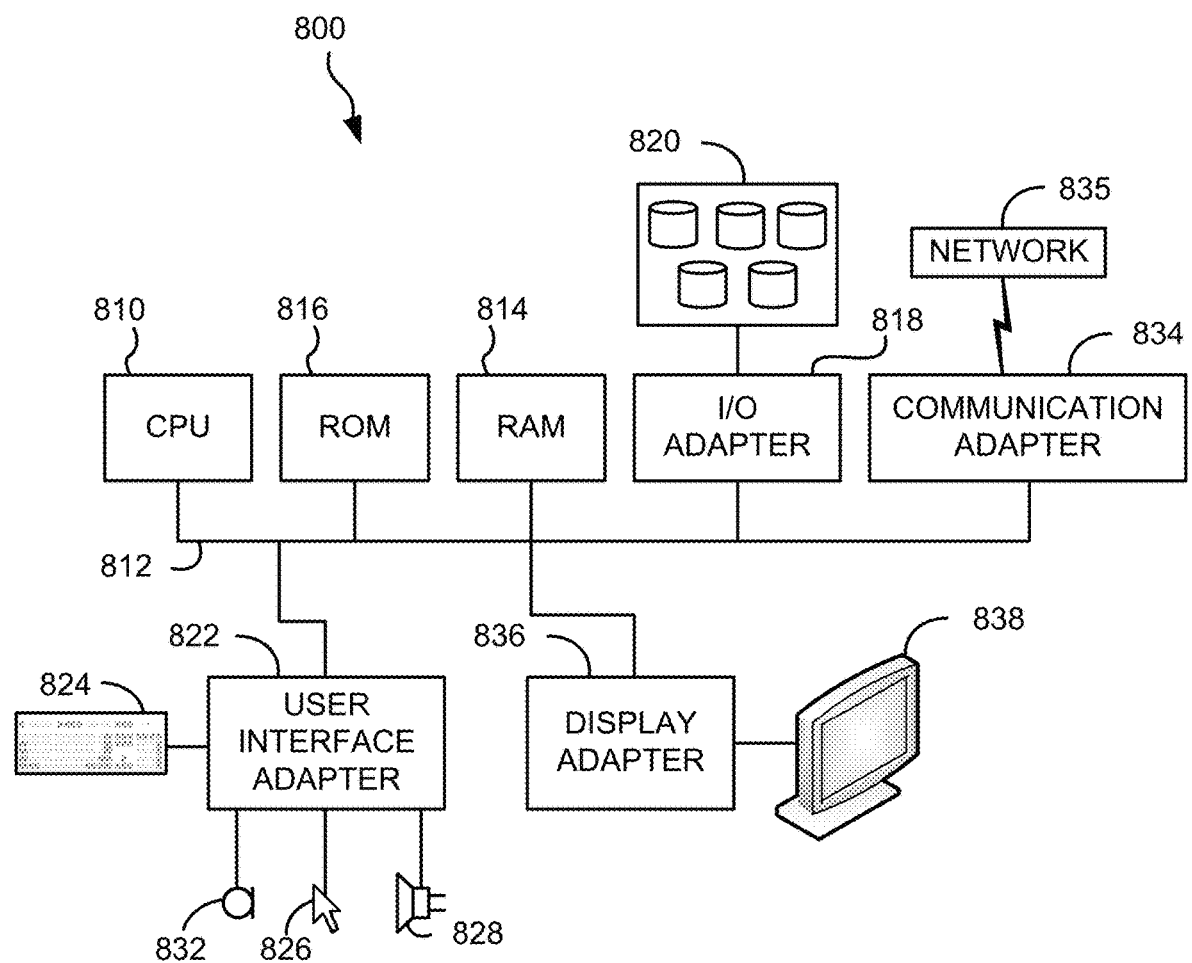
FIG. 8 is a representative hardware environment that may be associated with the servers and/or clients of FIG. 7, in accordance with one embodiment.

FIG. 8 shows a representative hardware environment associated with a user device 716 and/or server 714 of FIG. 7, in accordance with one embodiment. FIG. 8 illustrates a typical hardware configuration of a processor system 800 having a central processing unit 810, such as a microprocessor, and a number of other units interconnected via a system bus 812, according to one embodiment. In some embodiments, central processing unit 810 may include any of the approaches described above with reference to the one or more processors 210 of FIG. 2.

The processor system 800 shown in FIG. 8 includes a Random Access Memory (RAM) 814, Read Only Memory (ROM) 816, and an I/O adapter 818. According to some embodiments, which are in no way intended to limit the invention, I/O adapter 818 may include any of the approaches described above with reference to I/O adapter 218 of FIG. 2. Referring still to processor system 800 of FIG. 8, the aforementioned components 814, 816, 818 may be used for connecting peripheral devices such as storage subsystem 820 to the bus 812. In some embodiments, storage subsystem 820 may include a similar and/or the same configuration as data storage system 220 of FIG. 2. According to an example, which is in no way intended to limit the invention, storage subsystem 820 may include non-volatile data storage cards, e.g., having NVRAM memory cards, RAM, ROM, and/or some other known type of non-volatile memory, in addition to RAID controllers as illustrated in FIG. 2.

With continued reference to FIG. 8, a user interface adapter 822 for connecting a keyboard 824, a mouse 826, a speaker 828, a microphone 832, and/or other user interface devices such as a touch screen, a digital camera (not shown), etc., to the bus 812.

Processor system 800 further includes a communication adapter 834 which connects the processor system 800 to a communication network 835 (e.g., a data processing network) and a display adapter 836 which connects the bus 812 to a display device 838.

The processor system 800 may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 9:
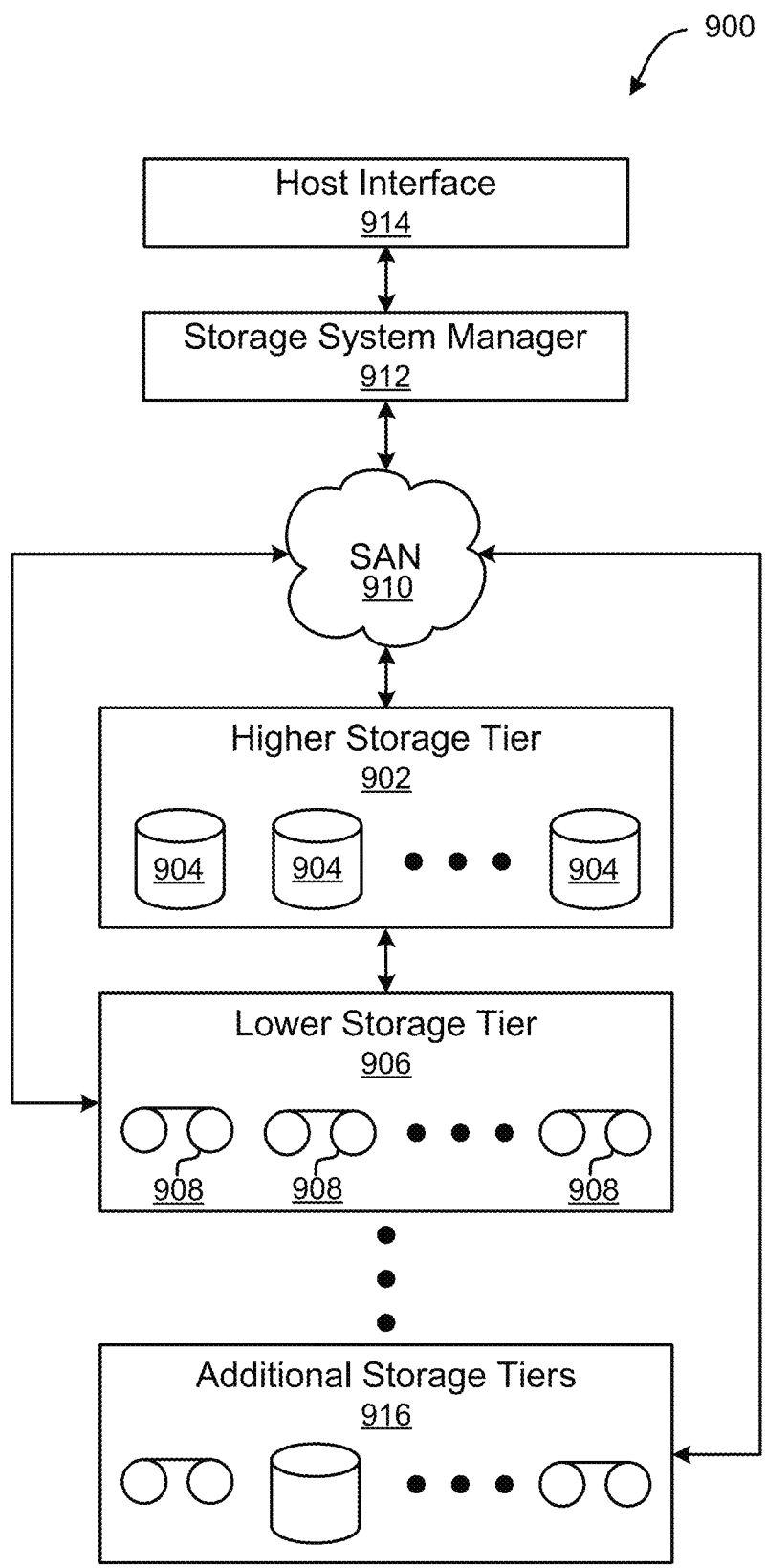
FIG. 9 is a tiered data storage system in accordance with one embodiment.

Moreover, FIG. 9 illustrates a storage system 900 which implements high level (e.g., SSD) storage tiers in combination with lower level (e.g., magnetic tape) storage tiers, according to one embodiment. Note that some of the elements shown in FIG. 9 may be implemented as hardware and/or software, according to various embodiments. The storage system 900 may include a storage system manager 912 for communicating with a plurality of media on at least one higher storage tier 902 and at least one lower storage tier 906. However, in other approaches, a storage system manager 912 may communicate with a plurality of media on at least one higher storage tier 902, but no lower storage tier. The higher storage tier(s) 902 preferably may include one or more random access and/or direct access media 904, such as hard disks, nonvolatile memory (NVM), NVRAM), solid state memory in SSDs, Flash memory, SSD arrays, Flash memory arrays, etc., and/or others noted herein or known in the art. According to illustrative examples, FIGS. 3-4 show exemplary architectures of SSD systems which may be used as a higher storage tier 902 depending on the desired embodiment.

Referring still to FIG. 9, the lower storage tier(s) 906 preferably includes one or more lower performing storage media 908, including sequential access media such as magnetic tape in tape drives and/or optical media, slower accessing HDDs, slower accessing SSDs, etc., and/or others noted herein or known in the art. One or more additional storage tiers 916 may include any combination of storage memory media as desired by a designer of the system 900. Thus, the one or more additional storage tiers 916 may, in some approaches, include a SSD system architecture similar or the same as those illustrated in FIGS. 1-2. Also, any of the higher storage tiers 902 and/or the lower storage tiers 906 may include any combination of storage devices and/or storage media.

The storage system manager 912 may communicate with the storage media 904, 908 on the higher storage tier(s) 902 and lower storage tier(s) 906 through a network 910, such as a storage area network (SAN), as shown in FIG. 9, or some other suitable network type. The storage system manager 912 may also communicate with one or more host systems (not shown) through a host interface 914, which may or may not be a part of the storage system manager 912. The storage system manager 912 and/or any other component of the storage system 900 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 900 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 902, may include a majority of SSD storage media for storing data in a higher performing storage environment, and remaining storage tiers, including lower storage tier 906 and additional storage tiers 916 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 902, while data not having one of these attributes may be stored to the additional storage tiers 916, including lower storage tier 906. Of course, one of skill in the art, upon reading the present descriptions, may devise many other combinations of storage media types to implement into different storage schemes, according to the embodiments presented herein.

According to some embodiments, the storage system (such as 900) may include logic configured to receive a request to open a data set, logic configured to determine if the requested data set is stored to a lower storage tier 906 of a tiered data storage system 900 in multiple associated portions, logic configured to move each associated portion of the requested data set to a higher storage tier 902 of the tiered data storage system 900, and logic configured to assemble the requested data set on the higher storage tier 902 of the tiered data storage system 900 from the associated portions.

Of course, this logic may be implemented as a method on any device and/or system or as a computer program product, according to various embodiments.

What is claimed is:
1. A computer-implemented method, comprising:
calibrating a first block of storage space in memory;
identifying a page in the calibrated first block having a highest raw bit error rate (RBER);
determining whether the RBER of the identified page is greater than an error correction code limit;
in response to determining that the RBER of the identified page is not greater than the error correction code limit, determining whether the RBER of the identified page is greater than a relocation limit;

in response to determining that the RBER of the identified page is not greater than a relocation limit, determining whether the first block has been excessively calibrated, wherein determining whether the first block has been excessively calibrated includes:

ascertaining a number of times that the first block has been calibrated in a given period of time, and determining whether the number of times that the first block has been calibrated is greater than a threshold which corresponds to the given period of time; and in response to determining that the first block has been excessively calibrated, relocating data in the first block to a second block of storage space in the memory.

2. The computer-implemented method of claim 1, comprising:

in response to determining that the RBER of the identified page is greater than the error correction code limit, using a data recovery procedure to recover the data in the first block; and relocating the recovered data to the second block of storage space.

3. The computer-implemented method of claim 2, wherein the data recovery procedure includes performing a RAID recovery operation.

4. The computer-implemented method of claim 1, comprising:

in response to determining that the RBER of the identified page is greater than a relocation limit, relocating the data in the first block to the second block of storage space.

5. The computer-implemented method of claim 1, comprising:

in response to determining that the first block has not been excessively calibrated, determining whether an amount of resources consumed in calibrating the first block is above a threshold by comparing the amount of resources consumed to the threshold.

6. The computer-implemented method of claim 1, wherein the memory includes three-dimensional triple-level cell NAND Flash.

7. A computer program product comprising a computer readable storage medium having program instructions embodied therewith, wherein the computer readable storage medium is not a transitory signal per se, the program instructions readable and/or executable by a processor to cause the processor to perform a method comprising:

calibrating, by the processor, a first block of storage space in memory;

identifying, by the processor, a page in the calibrated first block having a highest raw bit error rate (RBER);

determining, by the processor, whether the RBER of the identified page is greater than an error correction code limit;

in response to determining that the RBER of the identified page is not greater than the error correction code limit, determining, by the processor, whether the RBER of the identified page is greater than a relocation limit;

in response to determining that the RBER of the identified page is not greater than a relocation limit, determining, by the processor, whether the first block has been excessively calibrated, wherein determining whether the first block has been excessively calibrated includes:

ascertaining a number of times that the first block has been calibrated in a given period of time, and determining whether the number of times that the first block has been calibrated is greater than a threshold which corresponds to the given period of time; and in response to determining that the first block has been excessively calibrated according to predefined criteria, relocating, by the processor, data in the first block to a second block of storage space in the memory.

8. The computer program product of claim 7, the program instructions readable and/or executable by the processor to cause the processor to perform the method comprising:

in response to determining that the RBER of the identified page is greater than the error correction code limit, using, by the processor, a data recovery procedure to recover the data in the first block; and relocating, by the processor, the recovered data to the second block of storage space.

9. The computer program product of claim 8, wherein the data recovery procedure includes performing a RAID recovery operation.

10. The computer program product of claim 7, the program instructions readable and/or executable by the processor to cause the processor to perform the method comprising:

in response to determining that the RBER of the identified page is greater than a relocation limit, relocating, by the processor, the data in the first block to the second block of storage space.

11. The computer program product of claim 7, the program instructions readable and/or executable by the processor to cause the processor to perform the method comprising:

in response to determining that the first block has not been excessively calibrated, determining, by the processor, whether an amount of resources consumed in calibrating the first block is above a threshold by comparing the amount of resources consumed to the threshold.

12. The computer program product of claim 7, wherein the memory includes three-dimensional triple-level cell NAND Flash.

13. A system, comprising:

a processor; and logic integrated with and/or executable by the processor, the logic being configured to:

calibrate, by the processor, a first block of storage space in memory;

identify, by the processor, a page in the calibrated first block having a highest raw bit error rate (RBER);

determine, by the processor, whether the RBER of the identified page is greater than an error correction code limit;

in response to determining that the RBER of the identified page is not greater than the error correction code limit, determine, by the processor, whether the RBER of the identified page is greater than a relocation limit;

in response to determining that the RBER of the identified page is not greater than a relocation limit, determine, by the processor, whether the first block has been excessively calibrated, wherein determining whether the first block has been excessively calibrated includes:

ascertaining a number of times that the first block has been calibrated in a given period of time, and determining whether the number of times that the first block has been calibrated is greater than a threshold which corresponds to the given period of time; and in response to determining that the first block has been excessively calibrated, relocate, by the processor, data in the first block to a second block of storage space in the memory.

14. The system of claim 13, the logic being configured to:
in response to determining that the RBER of the identified page is greater than the error correction code limit, use, by the processor, a data recovery procedure to recover the data in the first block; and
relocate, by the processor, the recovered data to the second block of storage space,
wherein the data recovery procedure includes performing a RAID recovery operation.

15. The system of claim 13, the logic being configured to:
in response to determining that the RBER of the identified page is greater than a relocation limit, relocate, by the processor, the data in the first block to the second block of storage space.

16. The system of claim 13, the logic being configured to:
in response to determining that the first block has not been excessively calibrated, determine, by the processor, whether an amount of resources consumed in calibrating the first block is above a threshold by comparing the amount of resources consumed to the threshold.

17. The system of claim 13, wherein the memory includes three-dimensional triple-level cell NAND Flash.

\* \* \* \* \*